United States Patent [19]

Mayer

[11] 3,768,335
[45] Oct. 30, 1973

[54] CRANKSHAFT COMPOSED OF A PLURALITY OF SECTIONS WELDED TOGETHER

[75] Inventor: Karl Mayer, Nurnberg, Germany

[73] Assignee: Maschinenfabrik Augsburg-Nurnberg Aktiengesellschaft Werk Nurnberg, Nurnberg, Germany

[22] Filed: May 11, 1971

[21] Appl. No.: 142,275

[30] Foreign Application Priority Data
May 13, 1970 Germany.................. P 20 23 364.1
Feb. 15, 1971 Germany.................. P 21 07 130.7

[52] U.S. Cl............................. 74/597, 29/6, 74/605
[51] Int. Cl. ............................................. F16c 3/14
[58] Field of Search...................... 74/598, 597, 596, 74/595, 603, 605; 29/6

[56] References Cited
UNITED STATES PATENTS

| | | | |
|---|---|---|---|
| 3,537,333 | 11/1970 | Seifert et al. ........................ 74/597 |
| 3,144,702 | 8/1964 | Wuppermann .................... 74/597 X |
| 718,422 | 1/1903 | Brophy ............................. 74/598 X |
| 3,103,066 | 9/1963 | Harman ........................... 74/597 X |

Primary Examiner—Charles J. Myhre
Assistant Examiner—F. D. Shoemaker
Attorney—Walter Becker

[57] ABSTRACT

The specification discloses a crankshaft composed of a plurality of sections which are welded together and a method of making the crankshaft in which each said crankshaft section comprises a web of the crankshaft and at least a part of the journal portions on opposite sides thereof. In making the crankshaft, the sections are placed in end to end relation in the proper angularly oriented positions and are fixedly held relative to each other during the welding operation. The welding can be accomplished by electron beam welding or the welding can be accomplished by interposing disc shaped members between the opposite end of adjacent ones of the sections and then rotating the members and sections relatively while exerting axial pressure thereon to effect the said welding. At least in the case where the disc shaped members are interposed between adjacent ones of the crankshaft sections, an annular chamber is formed in at least one of the interengaging faces of each said member and the sections on opposite sides thereof to provide a space to receive material displaced during the welding operation. Lubricant passageways lead between the journal surfaces and through the webs and also through the disc shaped members when these are employed.

5 Claims, 4 Drawing Figures

PATENTED OCT 30 1973　　　　　　　　　　3,768,335

INVENTOR:
Karl Mayer
BY:
Walter Becker

CRANKSHAFT COMPOSED OF A PLURALITY OF SECTIONS WELDED TOGETHER

The present invention relates to a crankshaft composed of individual sections welded together, which individual sections each form a single piece and are produced by casting, forging, or the like. Furthermore, the said sections each have a crank web with two half crank pins, or one half crank pin and one half main shaft pin while the individual sections are welded together with the required setting relative to each other.

In connection with the design of engines it is known to forge crankshafts either from one piece or to make up a crankshaft from a plurality of sections. With crankshafts composed of a plurality of sections, the individual sections are interconnected by welding or by screwing them together while when using screw connections, positive connections such as interengaging teeth, or the like, are employed.

With a heretofore known crankshaft of the type involved which is composed of individual sections, the individual sections are equipped with a web, and depending on the position thereof, are furthermore equipped with two crank pins or one-half of one crank pin and of a main shaft pin. These individual sections are produced by welding. After adjusting the individual sections and setting the same relative to each other, the sections of the crank pins are interconnected by welding in such a way that two sections of adjacent crank pins form the bearing area for the connecting rod and two further sections form the bearing area for the respective main bearing. With a heretofore known crankshaft of this type, it is considered disadvantageous that the sections of the crank pins are provided with blind bores in which due to the supply of oil to the bearing areas, impurities collect and in this way may affect the through-flow of the lubricant.

It is, therefore, an object of the present invention to provide a crankshaft for engines which is composed of individual prefabricated sections which may be connected to each other by means of an economical welding method and the pivot sections or bearing areas of which are provided with such lubricating passages that will prevent a clogging up of said passages by impurities.

These objects and advantages of the invention will appear more clearly from the following specification, in connection with the accompanying drawing, in which.

Figure 1:
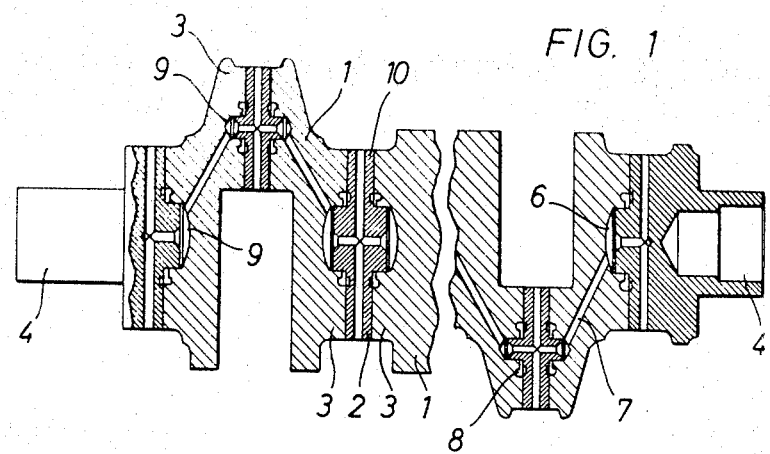
FIG. 1 is a longitudinal section through a crankshaft according to the invention for a six-cylinder engine, only some of the cranks being shown.

The composite crankshaft according to the present invention is characterized primarily in that between the crank pin portions to be connected to each other there is provided an intermediate member interconnecting the pivots and including annular chambers and lubricating passages which are worked in at those sides of said intermediate member which face the pivot.

In view of this design of the individual portions of the crankshaft and in view of the welding thereof referred to above, each bearing area can be produced in a single working operation whereby considerable saving in work and machining devices will be realized.

A further advantage of the invention consists in that the crank or main bearing pins and therewith also the intermediate ring may be equipped with relatively narrow bores for the supply of lubricant, said bores assuring a satisfactory flow-through of the lubricant and thus preventing deposits of impurifications in view of a uniform flow velocity. When providing the intermediate ring with lubricating passages the intermediate ring is provided with the necessary bores so that no further boring operations have to be carried out on the fixed crankshaft or on the welded crank pins.

In order to facilitate the assembly of the individual crank webs and thereby crank pins, it is suggested according to a further feature of the invention to provide the intermediate members at their two sides which face the crank or main bearing pins each with a centering member which as well as the intermediate ring itself is equipped with lubricating passages leading into the lubricating channels of the ring.

In order to be able to accommodate the welding seam as it is obtained during the welding of the individual crank pins to the intermediate member, in the interior of the bearing areas, it is suggested according to a further feature of the invention to equip the intermediate members at those sides thereof which face the crank pins, with annular passages, so-called annular grooves. These annular grooves are directed toward the end faces of the crank pins. By a close centering fit, a soiling of the oil by the welding seam will be prevented. Simultaneously, by means of this centering during the manufacturing step the advantage is obtained that in view of the slight offset arrow, smaller additions for the grinding are admissible.

A particularly simple method of making the crankshaft in conformity with the present invention consists in that the webs of the crank and main bearing pins to be welded to each other are, after insertion of the intermediate ring therebetween, pressed axially against the intermediate ring and are driven synchronously, and furthermore consist in that the intermediate ring is, during the welding of the crank and main bearing pin, secured against rotation or vice versa.

Due to the fact that the webs of a bearing area or the respective intermediate ring are driven synchronously, the prescribed offset is maintained so that post machining for the purpose of a precise offset are no longer necessary. In view of the design of the crankshaft in conformity with the present invention and the method of building up the same, it is possible to obtain a great diversification for the angle divisions for the crankshaft. Various welding methods may be employed, the friction welding method has proved particularly advantageous in this connection.

According to a further development of the invention, also the more modern electron beam welding method may be employed, whereby a further simplification and perfection with regard to the manufacture of crankshafts will be possible, inasmuch as only one of two half crank or main bearing pins to be connected to each other consists together with the intermediate member of a single piece.

In view of this design, the machining of the intermediate members on both sides and one welding seam becomes superfluous without the manufacture of the lubricating passages causing any difficulties. The time for assembling two crank webs or a crank web with a main bearing pin and for the machining of the intermediate member is thus further reduced. The assembly of the crank shaft may be effected in a simple manner by compressing all parts of said crankshaft after adjustment of the crankshaft pins in conformity with the respective desired crank angle by the centerings in radial direction so that they fit together precisely in axial direction whereupon all parts are then welded in a single working operation.

By means of this method it is possible to connect crankshafts for motors with any desired number of cylinders and any desired crank offset, without difficulties, by a simple scanning of the separating areas by means of the electron beam welder, and in an uninterrupted manner. A later turning off of the welding seam or welding brushes is entirely eliminated so that the crank and main bearing pins merely have to be ground over.

Referring now to the drawings in detail, the crankshaft according to the invention comprises substantially individual elements connected to each other by welding regardless of whether they are intended for a six-cylinder engine, an eight-cylinder, or a multicylinder engine. These individual elements which respectively have the shape of crank webs 1, intermediate members 2, crank pins 3 and main shaft pins 4 form each for themselves parts which have been produced separately and which are connected by welding to a total crankshaft. The crank webs 1 which are preferably produced as drop forged elements have crank pins 3 which, in conformity with FIGS. 1 and 2 and with intermediate members 2 interposed, are welded to the adjacent crank pin 3 of the other crank web 1. Inasmuch as the crank pins 3 have a width corresponding to the bearing area, it is advantageous for manufacturing reasons, to provide each crank web 1 with two halves of crank pins. Those crank webs 1 of the crank shaft which are adjacent the crank webs have the pertaining halves of crank pins 3 and intermediate members connected to the main shaft pin 4. Also, the connection of these crank webs 1 to the main shaft pin 4 is effected by welding. The individual intermediate members 2 are formed as annular elements and for purposes of facilitating installation have those sides thereof which face toward the halves of the crank pins 3 provided with centering means which are designed in conformity with the illustrated embodiments as centering pins 5. These centering pins 5 which protrude from the planes of the annular members and intermediate members 2 are arranged in so-called blind bores 6 of the sections of the crank pins 3 and they are machined so as to fit in such a manner that no lubricant can escape through the separating areas. For purposes of feeding a lubricant to the bearings, for instance, for the crank pins 3, the crank webs 1 and also the intermediate members 2 are provided with corresponding lubricating passages 7. The lubricating passages 7 on the crank webs 1 as well as the lubricating passages on the intermediate members 2 are, prior to welding together the individual parts of the crankshaft, provided in said individual part, whereby a considerable simplification in the manufacturing process will be obtained.

The welding of the individual crank pins 3 to the intermediate members 2 is preferably effected by friction welding (Reibschweissung) while the individual crank webs 1, namely the respective welded together crank webs 1 are turned synchronously by a driving machine, not shown in the drawings, and the intermediate ring 2 is, during this synchronous rotation, held stationary between the respective crank pins 3 during the entire welding operation.

Figure 2:
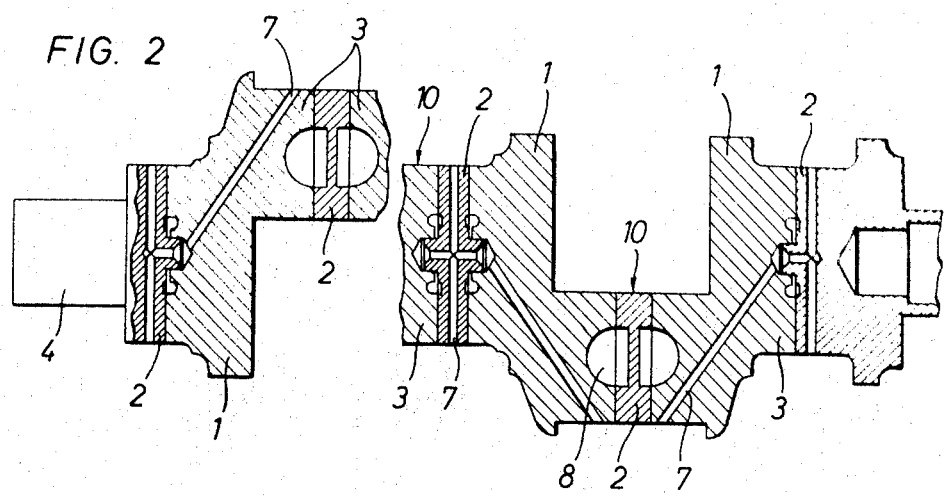
FIG. 2 is a longitudinal central section through a crankshaft according to the invention for an eight-cylinder engine while likewise only a few cranks are illustrated.

In order to absorb the welding seam being formed during the welding operation, in the interior of the crank pin 3, the intermediate members 2 and the sections of the crank pins are respectively provided with an annular groove 8 which is so dimensioned that the welding seam or ridge will find space therein. The chambers formed by this annular groove 8 are sealed with regard to the lubricating passages 7 and oil chamber 9 in such a way that oil cannot enter the annular grooves 8. Consequently, no impurification of the lubricant can occur which fact is very important for maintaining a good oil quality. The outer welding seam or ridge which, during the friction welding occurs on the bearing area 10 of the crank pins 3 is, following the welding together of the crank pins 3, separately removed. Important for the method according to the invention for welding together the crank shafts of FIGS. 1 and 2 is that the individual crank webs 1 or intermediate members 2 are firmly clamped into a machine not shown in the drawings in such a way that the required offset of the individual stroke will be maintained according to the predetermined angle pitch, and that these crank webs are driven synchronously in such a way that an undesired change in their angle pitch or offset will not be possible. Consequently, no post-machining is necessary, which fact is very important for an economical manufacture of crankshafts.

The embodiment according to FIG. 2 differs from that of FIG. 1 primarily only in that a portion of the crank pin 3 of the crank webs 1 is connected to somewhat different intermediate members 2. This is possible only and in some instances is desired because separate lubricating passages lead to the individual bearing areas 10. The intermediate members 2 in this instance are, as to their main features, identical with those of FIG. 1, and consequently, have the annular chambers 8 for receiving the welding seam or ridge. In contrast to the previously mentioned intermediate members 2, in this instance, the annular chambers 8 form large interconnecting chambers. This is possible due to the fact that with these intermediate members the centering member, for instance, the centering pin 5 can be omitted. The thus changed design of the intermediate member 2 at the areas which are subjected to a lubricating effect of its own has the advantage that the intermediate members 2 can be produced even easier than the first mentioned intermediate members 2.

Figures 3, 4:
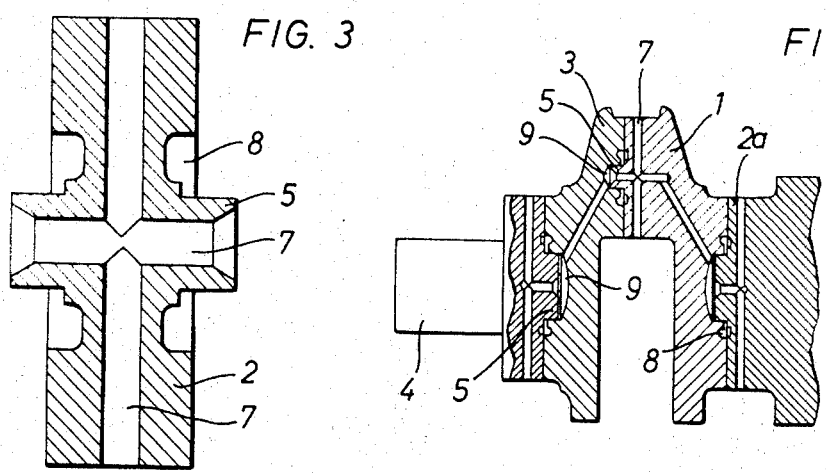
FIG. 3 shows a cross central section of an intermediate member for establishing the connection of the sections of the crank pins and main shaft pins.
FIG. 4 is a longitudinal section through the crankshaft corresponding to FIG. 1, but without separate intermediate members.

According to FIG. 4, the intermediate member 2a is, in contrast to FIGS. 1 and 2, not designed as a separate member, but is formed onto a section of the crank pin 3 or main bearing pin 4. In this way, each crank pin 3 and each main bearing pin 4 will have only one welding seam. The axial, radial, and inclined lubricating passages 7 can likewise easily be produced prior to the assembly of the respective parts.

The design is employed with electron beam welding because, in this instance, no parts have to be turned relative to each other during the welding operation. It is merely necessary to briefly scan the separating gap between two parts and to weld the entire crankshaft in one operation.

As will be seen from the drawings, particularly FIG. 3, radial as well as axial lubricating passages 7 may easily be provided for passing the oil therethrough.

It is, of course, to be understood that the present invention is not limited to the particular showing in the drawings, but also comprises any modifications within the scope of the appended claims. Thus, the invention is not limited to the three embodiments in the drawings. Further, the intermediate members 2, 2a for connecting the sections of the crank pins 3 may also have different shapes and may be equipped with differently designed lubricating passages 7. It is, of course, also possible, and illustrated in FIG. 2, to design the intermediate members 2 without lubricating passages 7. It is furthermore possible to provide the intermediate members with additional centering means such as pivots 5, or the like.

What is claimed is:

1. In a crankshaft comprising axially spaced journal portions and intervening web portions joining the journal portions together; a plurality of individual sections arranged in end to end relation and means including weld means interconnecting said sections at the ends thereof, each said section comprising a said web portion and at least a part of each of the said journal portions on each side thereof, said means including disc shaped members interposed between the opposed ends of adjacent ones of said sections and weld means joining said members to the said sections on opposite sides thereof, each member including at least one radial passage means and central axial passage means extending therethrough and intersecting said radial passage means, each said section adjacent a said member having further passage means therein communicating with said axial passage means.

2. A crankshaft according to claim 1 which includes lubricant passage means extending from the periphery of each said journal portion through the adjacent said web portions to the said journal portions on the opposite sides of the said web portions.

3. A crankshaft according to claim 1 which includes annular chamber means surrounding the juncture of said axial passage means and said further passage means and formed in the face of at least one of said members and the said section adjacent thereto.

4. In a crankshaft comprising axially spaced journal portions and intervening web portions joining the journal portions together; a plurality of individual sections arranged in end to end relation and means including weld means interconnecting said sections at the ends thereof, each said section comprising a said web portion and at least a part of each of the said journal portions on each side thereof, said means including disc shaped members interposed between the opposed ends of adjacent ones of said sections and weld means joining said members to the said sections on opposite sides thereof, said members and the said sections adjacent thereto being provided with cooperating telescoping elements of pin and socket means for aligning said members and sections.

5. A crankshaft according to claim 4 in which adjacent ones of said sections have the ends thereof in abutting relation and directly welded together, said abutting ends comprising cooperating telescoping elements of pin and socket means.

* * * * *